(12) United States Patent
Sannodo

(10) Patent No.: US 12,545,240 B2
(45) Date of Patent: Feb. 10, 2026

(54) REMOTE PARKING ASSISTANCE DEVICE

(71) Applicant: TOYOTA JIDOSHA KABUSHIKI KAISHA, Toyota (JP)

(72) Inventor: Shinya Sannodo, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 62 days.

(21) Appl. No.: 18/493,159

(22) Filed: Oct. 24, 2023

(65) Prior Publication Data

US 2024/0208487 A1 Jun. 27, 2024

(30) Foreign Application Priority Data

Dec. 22, 2022 (JP) ................. 2022-205491

(51) Int. Cl.
*B60W 30/06* (2006.01)
*B60W 50/14* (2020.01)

(52) U.S. Cl.
CPC ............ *B60W 30/06* (2013.01); *B60W 50/14* (2013.01); *B60W 2556/40* (2020.02); *B60W 2556/45* (2020.02)

(58) Field of Classification Search
CPC .. B60W 30/06; B60W 50/14; B60W 2556/40; B60W 2556/45
See application file for complete search history.

(56) References Cited

U.S. PATENT DOCUMENTS

| | | | |
|---|---|---|---|
| 8,903,567 B2 | 12/2014 | Morimoto et al. | |
| 10,464,554 B2 | 11/2019 | Okamura et al. | |
| 2017/0129537 A1 | 5/2017 | Kim | |
| 2019/0137990 A1* | 5/2019 | Golgiri | B60W 30/06 |
| 2019/0302754 A1 | 10/2019 | Tsuruoka | |
| 2020/0074759 A1* | 3/2020 | Seo | B62D 1/00 |
| 2020/0218249 A1 | 7/2020 | Sannodo et al. | |
| 2020/0310407 A1* | 10/2020 | Van Wiemeersch | B62D 15/0285 |
| 2021/0197772 A1 | 7/2021 | Tsumano | |
| 2024/0336226 A1* | 10/2024 | Saiki | H04B 17/318 |
| 2025/0058741 A1* | 2/2025 | Nimura | B60R 25/01 |

FOREIGN PATENT DOCUMENTS

DE 102014015655 A1 4/2016

* cited by examiner

*Primary Examiner* — Toya Pettiegrew
(74) *Attorney, Agent, or Firm* — SoraIP, Inc.

(57) ABSTRACT

In the remote parking assistance device, the assistance mode that can be executed in the remote parking assistance control is limited according to a detection distance that is a distance at which the presence or absence of a smart key can be detected by the vehicle system. Specifically, as the detection distance becomes shorter, the number of support modes that cannot be selected by the operator using the remote control terminal and/or the number of support modes in which remotely operated terminals alert the operator is increased.

2 Claims, 3 Drawing Sheets

| | | WAREHOUSING | | | DELIVERY | | | BACK AND FORTH MOVEMENT |
|---|---|---|---|---|---|---|---|---|
| | | PARALLEL | | COLUMN | PARALLEL | | COLUMN | |
| | | BACKWARD MOVEMENT | FORWARD MOVEMENT | | FORWARD MOVEMENT | BACKWARD MOVEMENT | | |
| SUPPORT MODE | | | | | | | | |
| DETECTION DISTANCE | 1.5m | △ | △ | × (DISCONTINUATION) | × (NOT STARTED) | △ | △ | ○ |
| | 2.5m | ○ | △ | △ | ○ | △ | ○ | ○ |
| | 3.0m | ○ | ○ | ○ | ○ | ○ | ○ | ○ |

FIG. 2

| SUPPORT MODE | WAREHOUSING | | | | DELIVERY | | | BACK AND FORTH MOVEMENT |
|---|---|---|---|---|---|---|---|---|
| | PARALLEL | | COLUMN | | PARALLEL | | COLUMN | |
| | BACKWARD MOVEMENT | FORWARD MOVEMENT | | | FORWARD MOVEMENT | BACKWARD MOVEMENT | | |
| DETECTION DISTANCE 1.5m | △ | △ | × (DISCON-TINUATION) | | × (NOT STARTED) | △ | △ | ○ |
| 2.5m | ○ | △ | △ | | ○ | △ | ○ | ○ |
| 3.0m | ○ | ○ | ○ | | ○ | ○ | ○ | ○ |

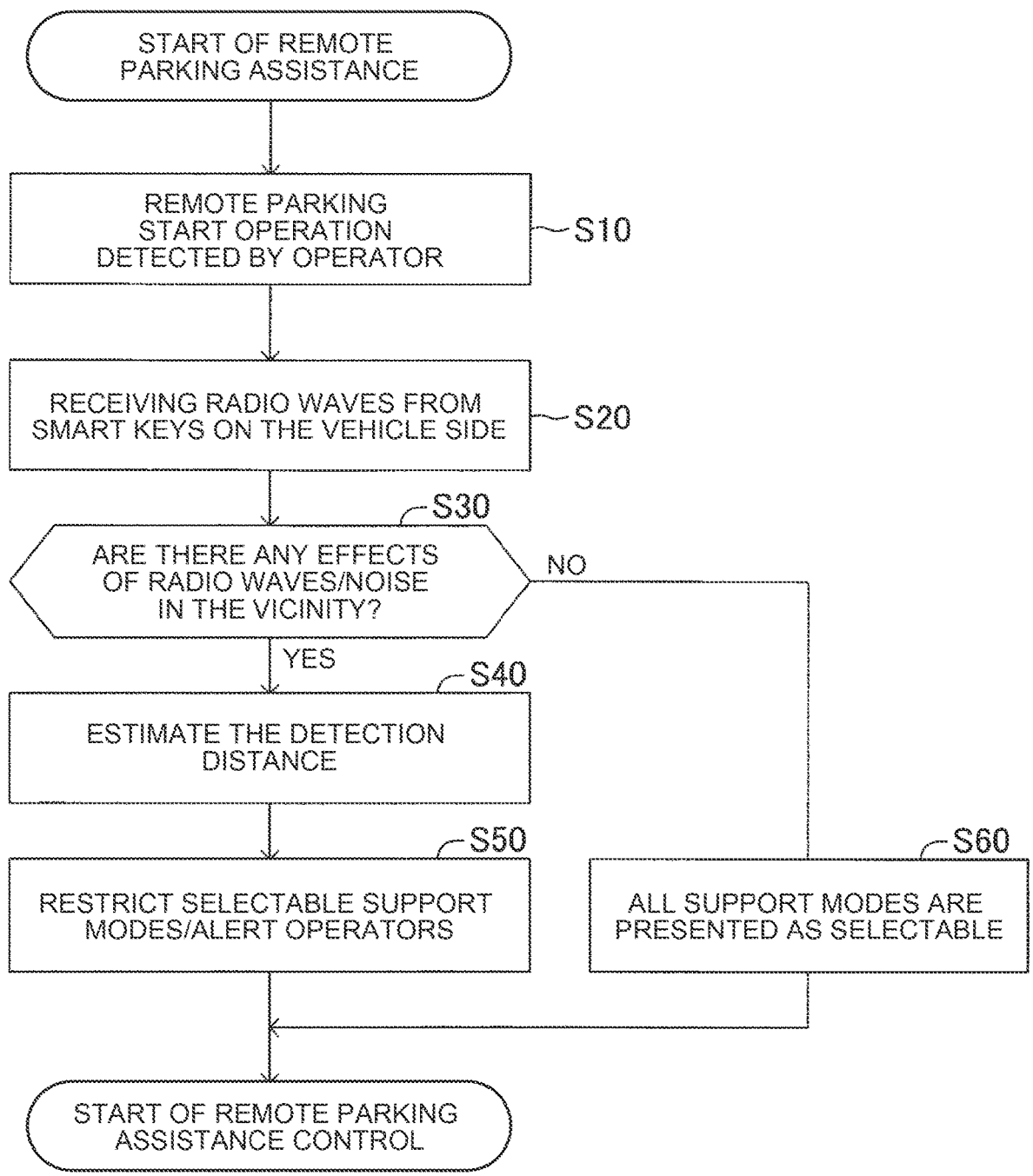

REMOTE PARKING ASSISTANCE DEVICE

CROSS-REFERENCE TO RELATED APPLICATION

This application claims priority to Japanese Patent Application No. 2022-205491 filed on Dec. 22, 2022, incorporated herein by reference in its entirety.

BACKGROUND

1. Technical Field

The present disclosure relates to a remote parking assistance device.

2. Description of Related Art

Vehicle control related to parking of a vehicle is defined in standards ISO 20900 (Partially automated parking systems (PAPS)) and ISO 16787 (Assisted parking systems (APS)).

In recent years, "remote parking" has been widely used. "Remote parking" is a technique in which an in-vehicle system executes at least a part of control of traveling, stopping, and turning (steering) of a vehicle that are related to parking, when an operator of the vehicle operates an operation device (a remote operation terminal such as a wireless controller) other than a driving operation device mounted on the vehicle.

In the remote parking, as the requirements for laws and regulations, it is necessary to guarantee that the operator is operating the vehicle at a position where the distance from the operator to the vehicle is equal to or less than 6 m. On the other hand, as the requirements for merchantability, it is required to be able to smoothly operate the vehicle at a position where the distance from the operator to the vehicle is equal to or greater than 3 m, and to be able to detect, by the vehicle system, whether there is a smart key carried by the operator.

As described above, in the remote parking, the requirements for laws and regulations and merchantability are met by detecting whether there is a smart key carried by the operator, by the vehicle system. For example, DE 102014015655 A discloses a technique in which a radio wave intensity is specified based on a plurality of radio waves received from a communication network in a parking assistance device that is remotely operated, and parking assistance is executed when the specified radio wave intensity is equal to or greater than a predetermined threshold value T1 and equal to or less than T2, and the parking assistance is not executed when the radio wave intensity is less than T1.

However, in practice, there is a situation in which facilities and/or equipment that generates radio waves and/or noise, such as radio towers for television broadcasting or radio clocks and/or fluorescent lights in underground parking lots, is present around the vehicle. Specific examples of such a situation may include, for example, an area surrounding the Lakihegy Tower in Hungary. The Lakihegy Tower is a radio tower, and it is known that the detection distance, which is a distance at which it is possible to detect whether there is a smart key by a vehicle system, becomes shorter as the distance to the tower becomes shorter due to interference between radio waves output from the tower and radio waves transmitted from the smart key.

Specifically, in a region where the distance from the tower is equal to or greater than 400 km, the detection distance is equal to or greater than 3 m, whereas in a region where the distance from the tower is 200 m to 400 m, the detection distance is 2.5 m to 3.0 m. In a region where the distance from the tower is 100 km to 200 km, the detection distance is 1.5 m to 2.5 m, and in a region where the distance from the tower is less than 100 km, the detection distance is less than 1.5 m. In such a situation, when the radio wave strength is less than T1, the parking assistance control itself is stopped according to the related art described above, and thus there is a possibility that the merchantability of the remote parking is remarkably deteriorated.

SUMMARY

As described above, in the remote parking according to the related art, in a situation in which facilities and/or equipment that generates radio waves and/or noise is present around the vehicle, the parking assistance control may be stopped and the merchantability of the remote parking may be remarkably deteriorated. That is, in the present technical field, there is a need for a technique capable of maintaining the merchantability of the remote parking as much as possible even in a situation in which facilities and/or equipment that generates radio waves and/or noise is present around the vehicle.

As a result of intensive study, the present inventors have found that the above problem can be solved by changing the assistance mode and/or the vehicle control that can be executed in remote parking in accordance with the detection distance of the smart key, that is, the length of the distance at which the vehicle system can detect whether there is a smart key carried by the operator.

Specifically, the remote parking assistance device according to the present disclosure (hereinafter, may be referred to as "the present disclosure device") includes: an information acquisition device; a detection distance specifying device; an assistance request receiving device; and a control unit. The information acquisition device acquires vehicle surrounding information including information about an object that is present around a vehicle to be parked. The detection distance specifying device specifies a detection distance that is a distance at which detecting whether a smart key is present is possible. The assistance request receiving device receives an assistance request for remote parking from a remote operation terminal based on an operation of the remote operation terminal by an operator.

The control unit executes remote parking assistance control when the assistance request is received in a case in which the detection distance is within a predetermined range.

Further, in the present disclosure device, the control unit is configured to limit an assistance mode that is able to be executed in the remote parking assistance control, depending on the detection distance.

In the present disclosure device, the remote parking assistance control itself is not stopped when the radio wave intensity becomes less than a predetermined threshold value, as in the remote parking according to the above-described related art, and the assistance mode that is able to be executed in the remote parking assistance control is limited depending on the detection distance that is a distance at which the vehicle system is able to detect whether the smart key is present. Therefore, according to the present disclosure device, the remote parking can be used at least in part even in a situation in which facilities and/or equipment that generates radio waves and/or noise is present around the vehicle.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 2 is a schematic diagram illustrating several support modes that may be implemented in remote parking assistance control; and FIG. 3 is a flow chart showing an exemplary flow of a process in the remote parking assist control executed in the present disclosure device.

DETAILED DESCRIPTION OF EMBODIMENTS

Figure 1:
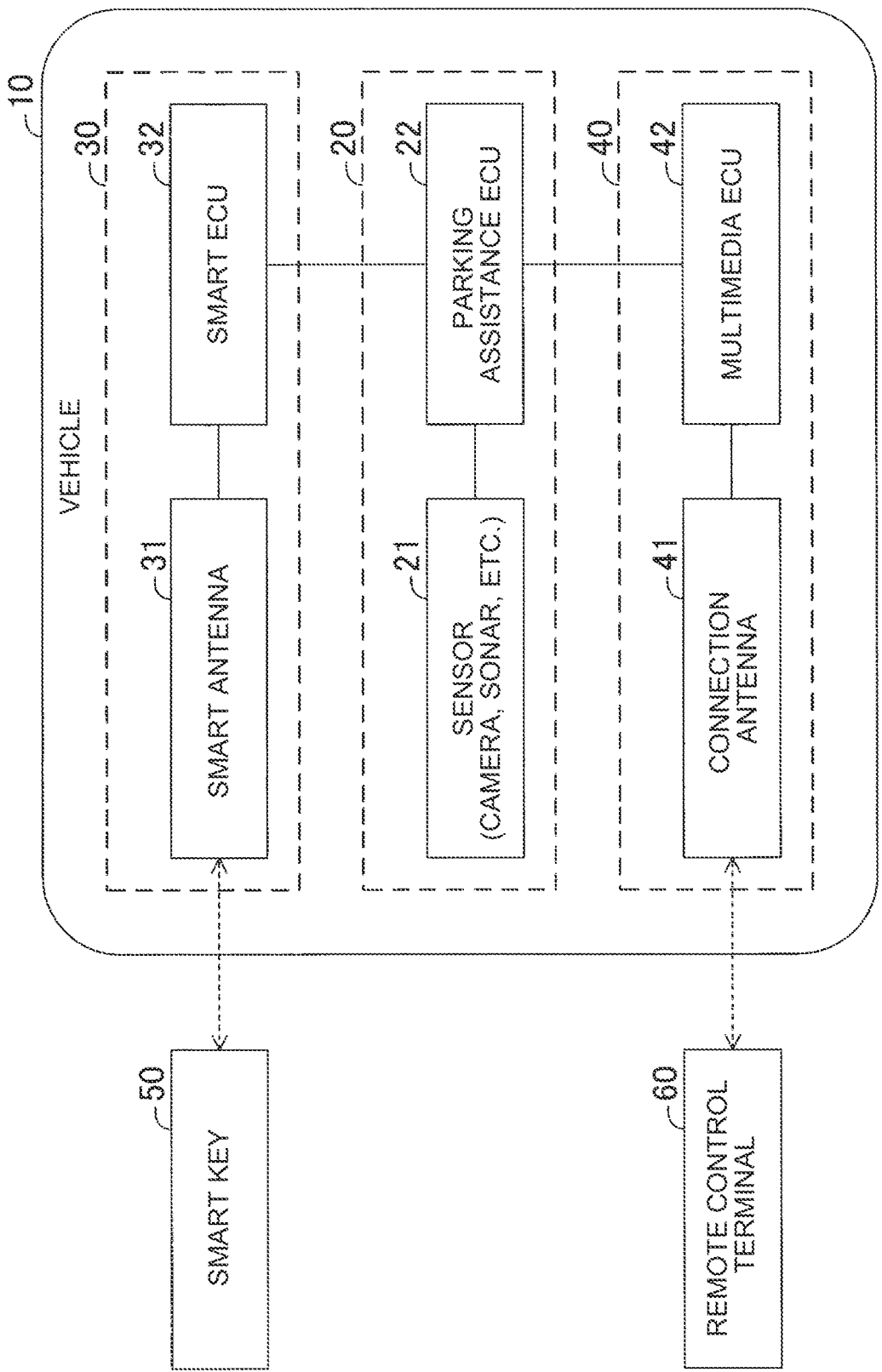
FIG. 1 is a schematic block diagram showing an example of a configuration of a remote parking assistance device (apparatus of the present disclosure) according to the present disclosure.

Hereinafter, a remote parking assistance device (apparatus of the present disclosure) according to the present disclosure will be described with reference to the drawings. As described above, the "remote parking" in the following description refers to a technology in which an in-vehicle system is responsible for at least a part of control of traveling, stopping, and turning (steering) of a vehicle related to parking by an operator of the vehicle operating device (a remote control terminal such as a wireless controller) other than a driving operation device mounted on the vehicle.

As described above, the present disclosure is a remote parking assistance device including an information acquisition device, a detection distance specifying device, an assistance request receiving device, and a control unit. The information acquisition device acquires vehicle surrounding information including information about an object that is present around a vehicle to be parked. The detection distance specifying device specifies a detection distance that is a distance at which detecting whether a smart key is present is possible. The assistance request receiving device receives an assistance request for remote parking from a remote operation terminal based on an operation of the remote operation terminal by an operator.

The control unit executes the remote parking assistance control when the assistance request is received when the detection distance is within the predetermined range. The remote parking assistance control includes the following processes.
  (a) A target position of the vehicle when the vehicle is moved to the parking section is set based on the vehicle periphery information.
  (b) A moving path for moving the vehicle from the current position of the vehicle to the target position is calculated.
  (c) A steering angle control for changing a steering angle of the vehicle, a driving force control for controlling a driving force of the vehicle, and a braking force control for controlling a braking force of the vehicle are executed so that the vehicle moves along the moving path.

That is, the present technology is a technology that can be applied to a technology conforming to ISO 20900 (PAPS) types 2 and ISO 16787 (APS) which are standards.

FIG. 1 is a schematic block diagram showing an example of a configuration of an apparatus of the present disclosure. The present disclosure device 101 illustrated in FIG. 1 is mounted on a vehicle 10, and includes a sensor 21 such as a camera, a sonar, and/or a radar, and a parking assistance ECU 22 as the information acquisition device 20. With such a configuration, the information acquisition device 20 can acquire the vehicle surroundings information including information about an object existing around the vehicle 10 to be parked.

In addition, the present disclosure device 101 includes a smart antenna 31 and a smart ECU 32 for receiving radio waves of a predetermined frequency transmitted from the smart key 50 as the detection distance specifying device 30. With such a configuration, the detection distance specifying device 30 can specify a detection distance that is a distance at which the presence or absence of the smart key 50 can be detected by the vehicle system.

The specific method for specifying the detection distance is not particularly limited. The detection distance specifying device 30 may be configured to specify a detection distance based on a difference or a ratio between an intensity of a radio wave signal of a frequency used for detection of the smart key 50 and an intensity of a noise other than the frequency. Specifically, for example, the intensity (peak value) of the radio wave in 135 KHz band used for detection of the smart key 50 and the intensity (floor value) of the radio wave (noise) in the frequency band other than the frequency may be measured by the smart ECU 32, and the detection distance may be estimated based on the difference between the peak value and the floor value.

Alternatively, the detection distance specifying device 30 may be configured to specify the detection distance by using an event, a phenomenon, and/or data other than radio waves transmitted from the smart key 50. Specifically, for example, the detection distance specifying device 30 may be configured to specify the detection distance based on the map data.

Further, the present disclosure device 101 includes, as the assistance request receiving device 40, a connecting antenna 41 and a multimedia ECU 42 for communicating with the remote control terminal 60 such as a smart phone and/or a tablet. With such a configuration, the assistance request receiving device 40 can receive a support request for remote parking of a vehicle (not shown) from the remote control terminal 60 based on the operation of the remote control terminal 60 by the operator, or can transmit information on a support mode that can be executed in the remote parking support control to the remote control terminal 60 and present the information to the operator. The communication method between the assistance request receiving device 40 and the remote control terminal 60 is not particularly limited, but specific examples thereof include Bluetooth (registered trademark) and/or Wi-Fi (registered trademark).

As described above, the control unit executes the remote parking assistance control when the assistance request is received when the detection distance is within the predetermined range. That is, in the embodiment illustrated in FIG. 1, it can be said that the control unit is configured by the parking assistance ECU 22 and the multimedia ECU 42.

In this specification, "ECU" is an Electronic Control Unit including a microcomputer as a main part, and is also referred to as "controllers". The microcomputer includes a CPU (processor), a ROM, RAM, a non-volatile memory, an interface, and the like. CPU is configured to implement the above-described functions by executing instructions (programs, routines) stored in ROM. These functions may be performed by a particular ECU constituting the inventive device, or may be performed in a distributed manner by a plurality of ECU. In the latter instance, the plurality of ECU may be configured to be connected to and capable of communicating with each other via, for example, Controller Area Network (CAN).

Further, in the apparatus of the present disclosure, the control unit is configured to limit the assistance mode that can be executed in the remote parking assistance control in accordance with the detection distance. Here, "restricting the support mode that can be executed in the remote parking assistance control" means that, among the plurality of support modes that can be executed when the detection distance that is the distance that can detect the presence or absence of the smart key by the vehicle system is sufficiently large, a support mode that cannot be selected by the operator is provided, the remote parking assistance control is stopped in the middle of the assistance mode, or any kind of reminder is given to the operator even in the support mode that can be selected by the operator.

FIG. 2 is a schematic diagram illustrating some assistance modes that may be performed in remote parking assistance control. In FIG. 2, seven types of support modes are illustrated: entrance by parallel parking in the backward direction, entrance by parallel parking in the forward direction, entrance by tandem parking, exit by forward movement from the parallel parking, exit by backward movement from the parallel parking, exit from the tandem parking, and simple back-and-forth movement.

As described at the beginning of the present specification, it is required that the vehicle can be smoothly operated at a position where the distance from the operator to the vehicle is equal to or greater than a 3 m value, and that the presence or absence of a smart key possessed by the operator can be detected by the vehicle system. That is, as shown in the bottom row of FIG. 2, when the detection distance is specified by the detection distance specifying device that the detection distance is equal to or larger than 3 m, all of the seven types of support modes described above can be executed as usual (see o mark in the drawing). Therefore, the operator can select a desired assistance mode from all of these assistance modes using the remote control terminal, and cause the apparatus of the present disclosure to execute the assistance mode.

However, as mentioned above, in situations where equipment and/or equipment that generate radio waves and/or noises, such as radio towers for television broadcasting or radio timepieces and/or fluorescent lights in underground parking lots, are present in the surroundings of vehicles, the detected range may be less than 3 m. In the embodiment illustrated in FIG. 2, when the detected distance is 2.5 m, if the operator who possesses the smart key and the remote control terminal is closer to the vehicle than usual, a desired support mode can be selected from all the support modes described above, and the support mode can be executed by the inventive device. However, in the entrance by parallel parking in the forward, the entrance by the tandem parking and the exit by retreat from the parallel parking, since the vehicle is largely turned, for example, a message and/or display for alerting about the contact with the vehicle moving to the target position is provided to the operator via the remote control terminal (see δ mark in the drawing).

When the detected distance becomes shorter and 1.5 m, some of the above-described support modes can be selected by the operator possessing the smart key and the remote control terminal further approaching the vehicle, but since the distance from the vehicle is closer than usual, for example, a message and/or a display for reminder regarding contact with the vehicle moving to the target position is provided to the operator via the remote control terminal (see δ mark in the drawing). Further, in the example shown in FIG. 2, the remote parking assist control is stopped in the middle of the movement to the target position for the warehousing by the tandem parking, the operator cannot select the delivery by advancing from the parallel parking in the remote control terminal (see × mark in the figure).

As described above, in the preferred embodiment of the present disclosure, the control unit may be configured to increase the support mode that cannot be selected by the operator using the remote control terminal as the detection distance becomes shorter and/or the support mode in which the operator is alerted by the remote control terminal.

Here, a flow of processing in the remote parking assist control executed in the apparatus of the present disclosure will be described. FIG. 3 is a flowchart illustrating an example of a flow of processing in the remote parking assist control executed in the apparatus of the present disclosure. First, in S10, an operation by an operator for starting remote parking by the operator is detected. As a specific example of such an operation, for example, an unlocking operation of a door key at the time of shipment, a setting of a parking position by an in-vehicle system at the time of warehousing, and the like can be exemplified. Next, in S20, radio waves from the smart key are received by the vehicle, and it is determined whether or not the presence or absence of the smart key is affected by radio waves and/or noises around the vehicle with respect to a detected distance that is a distance that can be detected by the vehicle system in S30.

If it is determined that there is an effect on the detection distance due to radio waves and/or noises around the vehicles (S30: Yes), the detection distance is estimated in the following S40. Then, in the following S50, as described referring to FIG. 2, the support mode that can be selected in accordance with the estimated detection range is restricted or attention is given to the operator. On the other hand, when it is determined that there is no effect on the detected range due to radio waves and/or noises in the vicinity of the vehicle (S30: No), all the support modes can be selected and are presented to the operator via the remote control terminal in the following S60.

Then, the remote parking assistance control is executed by the assistance mode selected by the operator using the remote control terminal via S50 or S60.

As described above, in the apparatus of the present disclosure, the remote parking assistance control itself is not stopped when the radio wave intensity becomes less than the predetermined threshold value as in the remote parking according to the above-described prior art, and the assistance mode that can be executed in the remote parking assistance control is limited in accordance with the detection distance that is a distance that can detect the presence or absence of the smart key by the vehicle system. Therefore, according to the device of the present disclosure, remote parking can be used at least in part even in situations where equipment and/or equipment for generating radio waves and/or noise are present around the vehicle.

For the purpose of describing the present disclosure, several embodiments having specific configurations have been described with reference to the accompanying drawings, but the scope of the present disclosure should not be construed as being limited to these exemplary embodiments, and it is needless to say that modifications can be made as appropriate within the scope of the claims and the matters described in the specification. Further, the present disclosure can be applied to an autonomous vehicle.

What is claimed is:

1. A remote parking assistance device comprising:
an information acquisition device configured to acquire vehicle surrounding information including information about an object that is present around a vehicle to be parked, the information acquisition device including a sensor and a first electronic control unit (ECU);
a detection distance specifying device configured to estimate a detection distance at which detecting whether an electronic key is present is possible, the detection distance specifying device including a first antenna configured to receive radio waves in 135 KHz band transmitted from the electronic key, and a second ECU configured to measure a peak value of the radio waves and a floor value of a noise other than the radio waves and estimate the detection distance based on a difference between the peak value and the floor value; and
an assistance request receiving device configured to receive an assistance request for remote parking from a remote operation terminal based on an operation of the remote operation terminal by an operator of the vehicle, the remote parking executing at least a part of control of the vehicle including traveling, stopping, and turning of the vehicle that are related to parking in response to the operator operating the remote operation terminal, the assistance request receiving device including a third ECU configured to communicate with the remote operation terminal via a second antenna, wherein
the first ECU and the third ECU are further configured to execute remote parking assistance control in response to the assistance request being received in a case in which the estimated detection distance is within a predetermined range, and
the third ECU is further configured to transmit, to the remote operation terminal, information on assistance modes during the remote parking assistance control, the information on assistance modes including:
   (i) first information indicating that execution of seven assistance modes is available in a case where the estimated detection distance is equal to or larger than 3 m, the seven assistance modes including entrance by parallel parking in backward direction, entrance by parallel parking in forward direction, entrance by tandem parking, exit by forward movement from parallel parking, exit by backward movement from parallel parking, exit from tandem parking, and simple back-and-forth movement,
   (ii) second information alerting the operator to a contact with the vehicle moving under three assistance modes that include the entrance by parallel parking in forward direction, the entrance by tandem parking, and the exit by backward movement from parallel parking, in a case where the estimated detection distance is 2.5 m, and
   (iii) third information indicating that execution of one assistance mode that is the entrance by tandem parking is discontinued and execution of one assistance mode that is the exit by forward movement from parallel parking is not available in a case where the estimated detection distance is 1.5 m.

2. The remote parking assistance device according to claim 1, wherein the third information further alerts the operator to the contact with the vehicle moving under four assistance modes that include the entrance by parallel parking in backward direction, the entrance by parallel parking in forward direction, the exit by backward movement from parallel parking, and the exit from tandem parking.

* * * * *